United States Patent
Yamakami et al.

(10) Patent No.: US 10,562,134 B2
(45) Date of Patent: Feb. 18, 2020

(54) FLUX-CORED WIRE FOR GAS-SHIELDED ARC WELDING

(71) Applicant: Kobe Steel, Ltd., Kobe-shi (JP)

(72) Inventors: Masafumi Yamakami, Kanagawa (JP); Masayuki Nagami, Kanagawa (JP); Yoshihiko Kitagawa, Kanagawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/755,824

(22) PCT Filed: Aug. 25, 2016

(86) PCT No.: PCT/JP2016/074772
§ 371 (c)(1),
(2) Date: Feb. 27, 2018

(87) PCT Pub. No.: WO2017/038609
PCT Pub. Date: Mar. 9, 2017

(65) Prior Publication Data
US 2018/0326544 A1    Nov. 15, 2018

(30) Foreign Application Priority Data

Aug. 28, 2015  (JP) .................. 2015-169351

(51) Int. Cl.
*B23K 35/02* (2006.01)
*B23K 35/30* (2006.01)
(Continued)

(52) U.S. Cl.
CPC ...... *B23K 35/3053* (2013.01); *B23K 35/0266* (2013.01); *B23K 35/30* (2013.01);
(Continued)

(58) Field of Classification Search
CPC .. B23K 35/02; B23K 35/025; B23K 35/0244; B23K 35/0255; B23K 35/0261;
(Continued)

(56) References Cited

U.S. PATENT DOCUMENTS

| 2008/0093352 A1* | 4/2008 | Jang ............... B23K 35/0266 219/145.22 |
| 2015/0314397 A1 | 11/2015 | Jeong et al. |
| 2016/0129532 A1* | 5/2016 | Saruwatari ......... B23K 35/3066 219/74 |

FOREIGN PATENT DOCUMENTS

| CN | 103302416 A | 9/2013 |
| EP | 2 374 571 A1 | 10/2011 |

(Continued)

OTHER PUBLICATIONS

Extended European Search Report dated Dec. 14, 2018 in European Patent Application No. 16841641.0, 9 pages.

(Continued)

*Primary Examiner* — Hung D Nguyen
(74) *Attorney, Agent, or Firm* — Oblon, McClelland, Maier & Neustadt, L.L.P.

(57) ABSTRACT

Provided is a flux-cored wire for gas-shielded arc welding that contains specific amounts of C, Mn, $TiO_2$, and Ni and specific amounts or less of P and S. The $TiO_2$ has a ratio ($\alpha 1/\alpha 2$) of 0.90-1.50 when $\alpha 1$ (mass %) is the content per wire total mass of particles having a size of 106 μm or smaller and $\alpha 2$ (mass %) is the content per wire total mass of particles having a size exceeding 106 μm.

12 Claims, 1 Drawing Sheet

(51) Int. Cl.
  B23K 35/368    (2006.01)
  C22C 38/00     (2006.01)
  C22C 38/42     (2006.01)
  C22C 38/44     (2006.01)
  C22C 38/46     (2006.01)
  C22C 38/48     (2006.01)
  C22C 38/50     (2006.01)
  C22C 38/54     (2006.01)
  C22C 38/58     (2006.01)
  B23K 35/22     (2006.01)
  C22C 38/04     (2006.01)

(52) U.S. Cl.
  CPC .......... *B23K 35/368* (2013.01); *C22C 38/001* (2013.01); *C22C 38/002* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/00* (2013.01); *C22C 38/04* (2013.01)

(58) Field of Classification Search
  CPC ............ B23K 35/0266; B23K 35/0288; B23K 35/24; B23K 35/26; B23K 35/262; B23K 35/264; B23K 35/266; B23K 35/268; B23K 35/30; B23K 35/3006; B23K 35/3013; B23K 35/302; B23K 35/3026; B23K 35/3033; B23K 35/304; B23K 35/3053; B23K 35/3066; B23K 35/3073; B23K 35/308; B23K 35/3086; B23K 35/3093; B23K 35/36; B23K 35/3601; B23K 35/3602; B23K 35/3605; B23K 35/3607; B23K 35/3608; B23K 35/361; B23K 35/3612; B23K 35/3618; B23K 35/362; B23K 35/368; B23K 35/40; B23K 35/404; B23K 35/406; C22C 38/00; C22C 38/001; C22C 38/002; C22C 38/004; C22C 38/005; C22C 38/02; C22C 38/04; C22C 38/06; C22C 38/08; C22C 38/12; C22C 38/14; C22C 38/16; C22C 38/22; C22C 38/24; C22C 38/38; C22C 38/40; C22C 38/42; C22C 38/44; C22C 38/46; C22C 38/48; C22C 38/50; C22C 38/54; C22C 38/58
  USPC .............. 219/73.2, 74, 137.2, 145.1, 145.22, 219/145.23, 146.1, 146.23, 146.24, 219/146.41, 146.51
  See application file for complete search history.

(56) References Cited

FOREIGN PATENT DOCUMENTS

| | | |
|---|---|---|
| EP | 2 905 105 | 8/2015 |
| JP | 62-33093 | 2/1987 |
| JP | 01-284497 | 11/1989 |
| JP | 04-118197 | 4/1992 |
| JP | 4-224094 A | 8/1992 |
| JP | 4-288992 A | 10/1992 |
| JP | 2000-254796 A | 9/2000 |
| JP | 3580720 B2 | 10/2004 |
| JP | 2011-79021 | 4/2011 |
| JP | 2013-158777 | 8/2013 |
| JP | 2013-184204 A | 9/2013 |
| JP | 2014-073505 | 4/2014 |
| WO | WO 2014/104731 A1 | 7/2014 |

OTHER PUBLICATIONS

International Search Report and Written Opinion dated Sep. 27, 2016 in PCT/JP2016/074772 (with English language translation).

* cited by examiner

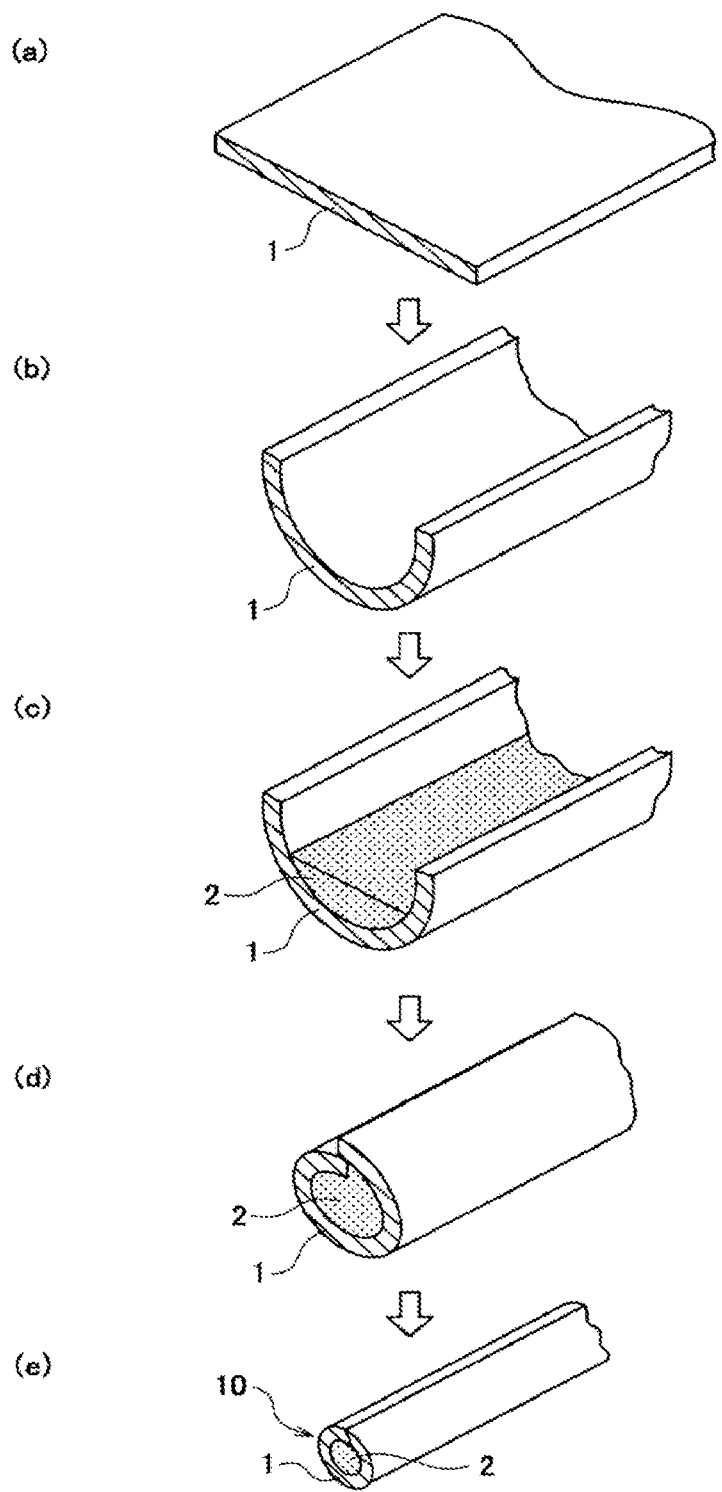

FLUX-CORED WIRE FOR GAS-SHIELDED ARC WELDING

TECHNICAL FIELD

The present invention relates to a flux-cored wire for gas-shielded arc welding. More specifically, the present invention relates to a flux-cored wire for gas shielded arc welding for all-position welding.

BACKGROUND ART

In the field of offshore structures or in the field of line pipes, there is an ongoing trend of advancing development of energy resources in very deep waters, expanding resource exploration/mining zone to an extreme sea area such as Arctic sea, and growing in the equipment size. Against this background of technical trend, the offshore structure or line pipe design is progressing to achieve high strength and high toughness, and more stringent requirements are imposed on the performance of the weld joint.

On the other hand, as for the welding material, a flux-cored wire for all-position welding is demanded in view of higher efficiency. In addition, high fracture toughness is also required for the weld metal obtained.

However, a conventional flux-cored wire for all-position welding forms a weld metal having a high oxygen amount and therefore, when gas-shielded arc welding is performed using the wire, it is difficult to ensure low-temperature toughness of the weld joint part.

Accordingly, for example, Patent Document 1 discloses a technique of restricting the steel outer sheath components and adding Cu, Ni, Ti and B to the flux filled, thereby greatly enhancing the seawater corrosion resistance of weld metal and obtaining low-temperature toughness.

CITATION LIST

Patent Document

Patent Document 1: JP-A-H04-224094

SUMMARY OF THE INVENTION

Technical Problems

However, in the technique described in Patent Document 1, since a large amount of metal fluoride is added, the arc becomes unstable for vertical welding, and good welding workability is not obtained. Furthermore, in the technique described in Patent Document 1, cold cracking resistance is not taken into particular account.

Accordingly, the conventional flux-cored wire has a problem in obtaining a weld metal ensuring good welding workability during vertical up welding and having cold cracking resistance. In addition, the flux-cored wire is also required to form a weld metal excellent in hot cracking resistance, low-temperature toughness, mechanical properties, defect resistance, etc.

To cope with the problem or requirement above, an object of the present invention is to provide a flux-cored wire for gas-shielded arc welding, with which a weld metal excellent in welding workability, hot cracking resistance, low-temperature toughness, mechanical properties and defect resistance and also excellent in cold cracking resistance is formed in all-position welding, particularly, in vertical welding.

The welding workability as used in the present application indicates wettability and good/poor bead shape (including arc stability). The mechanical properties as used in the present application indicate 0.2% yield strength and tensile strength, in addition to low-temperature toughness. The defect resistance as used in the present application indicates blow-hole resistance.

Solution to Problems

In order to solve the above problem(s), the present invention provides the following technical means.

The flux-cored wire for gas-shielded arc welding in the present invention has a steel outer sheath filled with a flux, and the flux-cored wire includes, relative to a total mass of the wire: C: 0.01 mass % or more and 0.20 mass % or less; Mn: 0.5 mass % or more and 5.0 mass % or less; $TiO_2$: 2.0 mass % or more and 10.0 mass % or less; and Ni: 0.10 mass % or more and 5.00 mass % or less, and P: 0.050 mass % or less, S: 0.050 mass % or less, and with respect to the $TiO_2$, a value of a ratio $\alpha 1/\alpha 2$ is 0.90 or more and 1.50 or less, wherein $\alpha 1$ (mass %) is a content of a particle having a particle size of 106 μm or less relative to the total mass of the wire, and $\alpha 2$ (mass %) is a content of a particle having a particle size of more than 106 μm relative to the total mass of the wire.

According to such a configuration, in a flux-cored wire for gas-shielded arc welding (hereinafter, sometimes referred to as a flux-cored wire or simply as a wire), the contents of predetermined elements are specified, whereby the strength and toughness of the weld metal are enhanced.

In addition, the particle size ratio ($\alpha 1/\alpha 2$) as the ratio of $TiO_2$ particle sizes is specified, whereby adequate welding workability (particularly arc stability) is achieved and the diffusible hydrogen content is reduced.

The flux-cored wire for gas-shielded arc welding in the present invention preferably further includes at least one of the following (a) to (i):

(a) relative to the total mass of the wire, at least one of Si and an Si oxide: 0.05 mass % or more and 1.00 mass % or less in total in terms of Si;

(b) relative to the total mass of the wire, at least one of Cr: 0.50 mass % or less, Cu: 0.50 mass % or less, and Mo: 0.50 mass % or less;

(c) relative to the total mass of the wire, metal Mg and an Mg alloy: 0.10 mass % or more and 1.20 mass % or less in total in terms of Mg;

(d) relative to the total mass of the wire, metal Ti and a Ti alloy: 0.80 mass % or less in total in terms of Ti;

(e) relative to the total mass of the wire, B and a B compound: 0.0010 mass % or more and 0.0200 mass % or less in total in terms of B;

(f) relative to the total mass of the wire, an F compound: 0.01 mass % or more and 0.50 mass % or less in total in terms of F, and a sum of a total in terms of Na of an Na compound and a total in terms of K of a K compound: 0.01 mass % or more and 1.00 mass % or less;

(g) relative to the total mass of the wire, at least one of Nb: 0.10 mass % or less and V: 0.10 mass % or less;

(h) relative to the total mass of the wire, $ZrO_2$: 0.50 mass % or less and $Al_2O_3$: 0.05 mass % or more and 1.00 mass % or less; and (i) relative to the total mass of the wire, Fe: 75.00 mass % or more.

According to the above configuration (a), the viscosity of molten pool decreases, and the fluidity of molten slag increases.

According to the above configuration (b), the strength of the weld metal is enhanced.

According to the above configuration (c), the deoxidizing action is promoted.

According to the above configuration (d), the toughness of the weld metal is enhanced.

According to the above configuration (e), the toughness of the weld metal is enhanced.

According to the above configuration (f), the diffusible hydrogen content in the weld metal is reduced, and the arc is stabilized.

According to the above configuration (g), the toughness of the weld metal is enhanced.

According to the above configuration (h), the bead shape of the weld metal is improved.

According to the above configuration (i), the flux-cored wire provides a further sufficient deposition amount and therefore, more excellent welding workability is achieved.

Advantageous Effects of the Invention

With the flux-cored wire for gas-shielded arc welding of the present invention, a weld metal excellent in welding workability, hot cracking resistance, low-temperature toughness, mechanical properties and defect resistance and also excellent in cold cracking resistance can be obtained.

BRIEF DESCRIPTION OF THE DRAWINGS

[FIGS. 1](a) to (e) are schematic diagrams for describing some steps in the production method of a flux-cored wire.

DESCRIPTION OF EMBODIMENTS

Embodiments for carrying out the present invention is described in detail below. In the flux-cored wire of this embodiment, a steel outer sheath is filled with a flux. In the flux-cored wire, C, Mn, $TiO_2$ and Ni are contained in predetermined amounts relative to the total mass of the wire, and the content of each of P and S is equal to or less than the predetermined amount. In the flux-cored wire, with respect to $TiO_2$, when the content of a particle having a particle size of 106 μm or less relative to the total mass of the wire is denoted by α1 (mass %) and the content of a particle having a particle size of more than 106 μm relative to the total mass of the wire is denoted by α2 (mass %), the value of the ratio α1/α2 is specified.

The flux-cored wire preferably further contains at least one of Si and an Si oxide in a predetermined total amount in terms of Si relative to the total mass of the wire. In addition, the flux-cored wire preferably further contains at least one of Cr, Cu and Mo in a predetermined amount relative to the total mass of the wire.

The flux-cored wire preferably further contains metal Mg and an Mg alloy in a predetermined total amount in terms of Mg relative to the total mass of the wire. In addition, the flux-cored wire preferably further contains metal Ti and a Ti alloy in a predetermined total amount in terms of Ti relative to the total mass of the wire. Furthermore, the flux-cored wire preferably further contains B and a B compound in a predetermined total amount in terms of B relative to the total mass of the wire.

The flux-cored wire preferably further contains an F compound in a predetermined total amount in terms of F, and, an Na compound, and a K compound in a predetermined total amount of the total in terms of Na and the total in terms of K, relative to the total mass of the wire. In addition, the flux-cored wire preferably further contains at least one of Nb and V in a predetermined amount relative to the total mass of the wire. Furthermore, the flux-cored wire preferably further contains $ZrO_2$ and $Al_2O_3$ in predetermined amounts relative to the total mass of the wire.

In the flux-cored wire of this embodiment, the components other than those described above, i.e., the remainder, are Fe and unavoidable impurities. The flux-cored wire preferably further contains Fe in a predetermined amount relative to the total mass of the wire.

In the flux-cored wire of this embodiment, C, Mn, $TiO_2$ and Ni are contained in predetermined amounts relative to the total mass of the wire, and the content of each of P and S is equal to or less than the predetermined amount. The contents of other components are not specified. More specifically, with respect to the total in terms of Si of at least one of Si and Si oxide, the contents of Cr, Cu and Mo, the total in terms of Mg of metal Mg and an Mg alloy, the total in terms of Ti of metal Ti and a Ti alloy, the total in terms of B of B and a B compound, the total in terms of F of an F compound, the total in terms of Na of an Na compound, the total in terms of K of a K compound, and the contents of Nb, V, $ZrO_2$, $Al_2O_3$, etc., these are optional components, and the contents thereof are not specified. However, the content of each of these components is preferably the later-described content.

The reasons for limiting the components of the flux-cored wire, and the $TiO_2$ particle size ratio are described below.

[C: 0.01 mass % or more and 0.20 mass % or less]

C has an effect of enhancing the strength of the weld metal. However, in the case where the C content is less than 0.01 mass % relative to the total mass of the wire, the effect is not sufficiently obtained, and the yield strength of the weld metal decreases. On the other hand, in the case where the C content exceeds 0.20 mass % relative to the total mass of the wire, Martensite-Austenite Constituent is produced in the weld metal, and the toughness deteriorates. For this reason, the C content is 0.01 mass % or more and 0.20 mass % or less relative to the total mass of the wire. From the viewpoint of further enhancing the effect above, the C content is preferably 0.02 mass % or more, more preferably 0.03 mass % or more. From the viewpoint of further enhancing the toughness, it is preferably 0.18 mass % or less, more preferably 0.16 mass % or less.

[Mn: 0.5 mass % or more and 5.0 mass % or less]

Mn has an effect of promoting deoxidation of the weld metal and increasing the toughness and strength of the weld metal. However, in the case where the Mn content is less than 0.5 mass % relative to the total mass of the wire, the above-described effect is insufficient, leading to generation of a blow hole in the weld metal or deterioration of the toughness and strength of the weld metal. On the other hand, in the case where the Mn content exceeds 5.0 mass % relative to the total mass of the wire, the strength of the weld metal is excessively increased to readily cause cold cracking. For this reason, the Mn content is 0.5 mass % or more and 5.0 mass % or less relative to the total mass of the wire. From the viewpoint of further enhancing the effect above, the Mn content is preferably 0.8 mass % or more, more preferably 1.0 mass % or more. From the viewpoint of further suppressing occurrence of cold cracking, it is preferably 4.0 mass % or less, more preferably 3.5 mass % or less.

[$TiO_2$: 2.0 mass % or more and 10.0 mass % or less]

$TiO_2$ is a main component of a slag. In the case where the $TiO_2$ content is less than 2.0 mass % relative to the total mass of the wire, it is difficult to perform welding in a position (vertical, overhead, etc.) except for flat, and all-position weldability cannot be ensured. On the other hand, in the case where the $TiO_2$ content exceeds 10.0 mass % relative to the total mass of the wire, $TiO_2$ remains as a fine particle in the weld metal, and the toughness of the weld metal deteriorates. For this reason, the $TiO_2$ content is 2.0 mass % or more and 10.0 mass % or less relative to the total mass of the wire. From the viewpoint of further enhancing the effect above, the $TiO_2$ content is preferably 3.0 mass % or more, more preferably 4.0 mass % or more. From the viewpoint of further enhancing the toughness, it is preferably 9.0 mass % or less, more preferably 8.0 mass % or less.

[Ni: 0.10 mass % or more and 5.00 mass % or less]

Ni is an element contributing to ensuring the toughness of the weld metal by matrix reinforcement. In the case where the Ni content is less than 0.10 mass % relative to the total mass of the wire, the matrix reinforcement effect is insufficient, and the toughness of the weld metal deteriorates. On the other hand, in the case where the Ni content exceeds 5.00 mass % relative to the total mass of the wire, hot cracking readily occurs in the weld metal due to microsegregation. For this reason, the Ni content in the flux is 0.10 mass % or more and 5.00 mass % or less relative to the total mass of the wire. From the viewpoint of further enhancing the effect above, the Ni content is preferably 0.20 mass % or more, more preferably 0.50 mass % or more. From the viewpoint of further suppressing occurrence of hot cracking, it is preferably 4.50 mass % or less, more preferably 4.00 mass % or less.

[P: 0.050 mass % or less (including 0 mass %)]

P is an unavoidable impurity, and in the case where the P content exceeds 0.050 mass % relative to the total mass of the wire, the hot cracking resistance of weld metal is reduced due to microsegregation. For this reason, the P content is restricted to be 0.050 mass % or less relative to the total mass of the wire. From the viewpoint of further enhancing the hot cracking resistance, the P content is preferably 0.040 mass % or less, more preferably 0.030 mass % or less. The P content may be 0 mass %.

[S: 0.050 mass % or less (including 0 mass %)]

S is an unavoidable impurity, and in the case where the S content exceeds 0.050 mass % relative to the total mass of the wire, the hot cracking resistance of the weld metal is reduced due to microsegregation. For this reason, the S content is restricted to be 0.050 mass % or less relative to the total mass of the wire. From the viewpoint of further enhancing the hot cracking resistance, the S content is preferably 0.040 mass % or less, more preferably 0.030 mass % or less. The S content may be 0 mass %.

[At least one of Si and Si oxide: 0.05 mass % or more and 1.00 mass % or less in total in terms of Si]

The flux-cored wire of this embodiment preferably contains at least one of Si and an Si oxide. The metal Si produces $SiO_2$ having an effect of increasing the fluidity by its deoxidizing action. Here, Si added in the form of an oxide is reduced by a redox reaction with a molten metal at the molten slag interface and is present as metal Si in the molten metal.

In the case where the content of at least one of Si and an Si oxide in total in terms of Si is 0.05 mass % or more relative to the total mass of the wire, the deoxidizing effect is further enhanced, and a blow hole is less likely to be formed in the weld metal. On the other hand, in the case where the content of at least one of Si and an Si oxide in total in terms of Si is 1.00 mass % or less, the strength of the weld metal is not excessively increased, and cold cracking hardly occurs. For this reason, in the case of adding at least one of Si and an Si oxide, the content thereof is, in total in terms of Si, preferably 0.05 mass % or more and 1.00 mass % or less relative to the total mass of the wire. From the viewpoint of further enhancing the effect above, the content of at least one of Si and an Si oxide is, in total in terms of Si, more preferably 0.10 mass % or more, still more preferably 0.30 mass % or more. From the viewpoint of further suppressing occurrence of cold cracking, it is more preferably 0.80 mass % or less, still more preferably 0.50 mass % or less.

As for the preferable content of each of Si and an Si oxide, Si is from 0.15 to 0.35 mass %, and the Si oxide is from 0.15 to 0.35 mass %.

[At least one of Cr: 0.50 mass % or less, Cu: 0.50 mass % or less, and Mo: 0.50 mass % or less]

Cr is an element contributing to enhancement of the strength of the weld metal. In the case where the Cr content is 0.50 mass % or less relative to the total mass of the wire, the strength of the weld metal is not excessively increased, and cold cracking hardly occurs. In addition, hot cracking of the weld metal due to microsegregation is less likely to occur. For this reason, in the case of adding Cr, the Cr content is preferably 0.50 mass % or less relative to the total mass of the wire. From the viewpoint of further suppressing occurrence of cold cracking, the Cr content is more preferably 0.45 mass % or less, still more preferably 0.40 mass % or less. From the viewpoint of further enhancing the effect above, it is preferable to contain this element in an amount of 0.05 mass % or more.

Cu is an element contributing to enhancement of the strength of the weld metal. In the case where the Cu content is 0.50 mass % or less relative to the total mass of the wire, the strength of the weld metal is not excessively increased, and cold cracking hardly occurs. In addition, hot cracking of the weld metal due to microsegregation is less likely to occur. For this reason, in the case of adding Cu, the Cu content is preferably 0.50 mass % or less relative to the total mass of the wire. From the viewpoint of further suppressing occurrence of cold cracking and occurrence of hot cracking, the Cu content is more preferably 0.45 mass % or less, still more preferably 0.40 mass % or less. From the viewpoint of further enhancing the effect above, it is preferable to contain this element in an amount of 0.05 mass % or more.

Mo is an element contributing to enhancement of the strength of weld metal. In the case where the Mo content is 0.50 mass % or less relative to the total mass of the wire, the strength of the weld metal is not excessively increased, and cold cracking hardly occurs. For this reason, in the case of adding Mo, the Mo content is preferably 0.50 mass % or less relative to the total mass of the wire. From the viewpoint of further suppressing occurrence of cold cracking, the Mo content is the Mo content is more preferably 0.45 mass % or less, still more preferably 0.40 mass % or less. From the viewpoint of further enhancing the effect above, it is preferably 0.05 mass % or more.

The total of the Cr, Cu and Mo contents is preferably 0.05 mass % or more and preferably 0.45 mass % or less.

[Metal Mg and Mg alloy: 0.10 mass % or more and 1.20 mass % or less in total in terms of Mg]

Mg is an element having a deoxidizing action, and the flux-cored wire of this embodiment preferably contains, as an Mg source, at least one of metal Mg and an Mg alloy. In the case where the content of metal Mg and an Mg alloy in total in terms of Mg is 0.10 mass % or more relative to the total mass of the wire, the deoxidizing effect is further enhanced, and since the amount of oxygen in the weld metal decreases and the impact value increases, the toughness is further improved. On the other hand, in the case where the content of metal Mg and an Mg alloy in total in terms of Mg is 1.20 mass % or less relative to the total mass of the wire, the strength of the weld metal is not excessively increased, and cold cracking hardly occurs. For this reason, in the case of adding metal Mg and an Mg alloy, the content of metal Mg and an Mg alloy is, in total in terms of Mg, preferably 0.10 mass % or more and 1.20 mass % or less relative to the total mass of the wire. From the viewpoint of further enhancing the effect above, the content of metal Mg and an Mg alloy is, in total in terms of Mg, more preferably 0.20 mass % or more, still more preferably 0.40 mass % or more. From the viewpoint of further suppressing occurrence of cold cracking, it is more preferably 0.80 mass % or less, still more preferably 0.60 mass % or less.

[Metal Ti and Ti alloy: 0.80 mass % or less in total in terms of Ti]

Ti is an element contributing to enhancement of the toughness of the weld metal. Ti is added in the form of a metal or an alloy. Out of Ti sources, in the case where the total content of metal Ti and a Ti alloy is, in terms of Ti, 0.80 mass % or less relative to the total mass of the wire, the amount of solute Ti in the weld metal decreases to cause no precipitation of TiC in a reheated part, and the toughness is further enhanced. For this reason, in the case of adding metal Ti and a Ti alloy, the content of metal Ti and a Ti alloy is, in total in terms of Ti, preferably 0.80 mass % or less relative to the total mass of the wire. From the viewpoint of further enhancing the toughness of weld metal, the content of metal Ti and a Ti alloy is, in total in terms of Ti, more preferably 0.70 mass % or less, still more preferably 0.60 mass % or less. From the viewpoint of further enhancing the effect above, it is preferable to contain the component(s) in an amount of 0.10 mass % or more.

[B and B compound: 0.0010 mass % or more and 0.0200 mass % or less in total in terms of B]

B has an effect of enhancing the toughness of the weld metal by segregating at the prior austenite ($\gamma$) grain boundary, thereby preventing precipitation of pro-eutectoid ferrite ($\alpha$). In the case where the content of B and a B compound in total in terms of B is 0.0010 mass % or more relative to the total mass of the wire, the effect thereof is further sufficiently obtained. On the other hand, in the case where the content of B and a B compound in total in terms of B is 0.0200 mass % or less relative to the total mass of the wire, hot cracking (solidification cracking) is less likely to occur in the weld metal.

For this reason, in the case of adding B and a B compound, the content of B and a B compound is preferably 0.0010 mass % or more and 0.0200 mass % or less in total in terms of B relative to the total mass of the wire. From the viewpoint of further enhancing the effect above, the content of B and a B compound is, in total in terms of B more preferably 0.0020 mass % or more, still more preferably 0.0030 mass % or more. From the view point of more suppressing occurrence of hot cracking, it is more preferably 0.0180 mass % or less, still more preferably 0.0160 mass % or less.

[F compound: 0.01 mass % or more and 0.50 mass % or less in total in terms of F, and sum of the total in terms of Na of Na compound and the total in terms of K of K compound: 0.01 mass % or more and 1.00 mass % or less]

An F compound has an effect of lowering the H partial pressure in the arc atmosphere and decreasing the diffusible hydrogen content in the weld metal, and the flux-cored wire of this embodiment contains one kind of or two or more kinds of F compounds. By reducing the diffusible hydrogen content in the weld metal, occurrence of cold cracking can be suppressed. Specific examples of the F compound added to the flux-cored wire of this embodiment include $CaF$, $BaF_2$, $NaF$, $K_2SiF_6$, $SrF_2$, $AlF_3$, $MgF_2$, and $LiF$. In the case where the content of an F compound in total in terms of F is 0.01 mass % or more relative to the total mass of the wire, the diffusible hydrogen content in the weld metal decreases, and cold cracking is less likely to occur. On the other hand, in the case where the content of an F compound in total in terms of F is 0.50 mass % or less relative to the total mass of the wire, since the wire is less likely to absorb moisture, the diffusible hydrogen content in the weld metal decreases, and as a result, cold cracking is less likely to occur. In addition, arc stability is not readily deteriorated. For this reason, in the case of adding F, the content of an F compound in total in terms of F is preferably 0.01 mass % or more and 0.50 mass % or less relative to the total mass of the wire. From the viewpoint of further enhancing the effect above, the content of an F compound is, in total in terms of F more preferably 0.05 mass % or more, still more preferably 0.10 mass % or more. From the viewpoint of further suppressing occurrence of cold cracking, it is more preferably 0.30 mass % or less, still more preferably 0.25 mass % or less.

Na and K have an effect of stabilizing the arc. Specific examples of the Na compound added to the flux-cored wire of this embodiment include $NaF$, $Na_2O$, and $Na_2CO_3$. Specific examples of the K compound added to the flux-cored wire of this embodiment include $K_2O$, $KF$, and $K_2SiF_6$. In the case where the sum of the total content in terms of Na of an Na compound and the total content in terms of K of a K compound (hereinafter, sometimes referred to as the total of Na compound and K compound) is 0.01 mass % or more relative to the total mass of the wire, the above-described effect is more sufficiently obtained, and the arc is further stabilized. On the other hand, in the case where the total of Na compound and K compound is 1.00 mass % or less, moisture absorption resistance of the wire increases, and the diffusible hydrogen content in the weld metal decreases, and as a result, cold cracking is less likely to occur. For this reason, in the case of adding an Na compound and a K compound, the total of Na compound and K compound is preferably 0.01 mass % or more and 1.00 mass % or less relative to the total mass of the wire. From the viewpoint of further enhancing the effect above, the total of Na compound and K compound is more preferably 0.05 mass % or more, still more preferably 0.10 mass % or more. From the viewpoint of further suppressing occurrence of cold cracking, it is more preferably 0.50 mass % or less, still more preferably 0.30 mass % or less. It is also possible to contain only either one of the Na compound and the K compound.

The flux-cored wire preferably contains all of the F compound, the Na compound and the K compound, but it may also be possible to contain only any one thereof.

[At least one of Nb: 0.10 mass % or less and V: 0.10 mass % or less]

Nb is an alloying agent but readily segregates at the grain boundary. In the case where the Nb content is 0.10 mass % or less relative to the total mass of the wire, segregation at the grain boundary is less likely to occur, and grain boundary fracture is hardly generated, and as a result, the toughness of the weld metal is further enhanced. For this reason, in the case of adding Nb, the Nb content is preferably 0.10 mass % or less relative to the total mass of the wire. From the viewpoint of further enhancing the toughness, the Nb content is more preferably 0.05 mass % or less, still more preferably 0.03 mass % or less.

V is an alloying agent but readily segregates at the grain boundary. In the case where the V content is 0.10 mass % or less relative to the total mass of the wire, segregation at the grain boundary is less likely to occur, and grain boundary fracture is hardly generated, and as a result, the toughness of the weld metal is further enhanced. For this reason, in the case of adding V, the V content is preferably 0.10 mass % or less relative to the total mass of the wire. From the viewpoint of further enhancing the toughness, the V content is more preferably 0.05 mass % or less, still more preferably 0.03 mass % or less.

The total of the Nb and V contents is preferably 0.03 mass % or less.

[$ZrO_2$: 0.50 mass % or less and $Al_2O_3$: 0.05 mass % or more and 1.00 mass % or less]

$ZrO_2$ has an effect of enhancing the bead shape and can therefore be added, if desired. In the case where the $ZrO_2$ content is 0.50 mass % or less relative to the total mass of the wire, wettability of bead at the toe portion is enhanced, and a convex bead shape is less likely to be formed. For this reason, in the case of adding $ZrO_2$, the content thereof is preferably 0.50 mass % or less relative to the total mass of the wire. From the viewpoint of further improving the bead shape, the $ZrO_2$ content is more preferably 0.30 mass % or less, still more preferably 0.20 mass % or less. From the viewpoint of further enhancing the effect above, it is preferable to contain this oxide in an amount of 0.05 mass % or more.

$Al_2O_3$ has an effect of enhancing the bead shape and can therefore be added, if desired. In the case where the $Al_2O_3$ content is 0.05 mass % or more relative to the total mass of the wire, the effect above is sufficiently obtained. On the other hand, in the case where the $Al_2O_3$ content is 1.00 mass % or less relative to the total mass of the wire, wettability of the bead at the toe portion is enhanced, and a convex bead shape is less likely to be formed. For this reason, in the case of adding $Al_2O_3$, the content thereof is preferably 0.05 mass % or more and 1.00 mass % or less relative to the total mass of the wire. From the viewpoint of further enhancing the effect above, the $Al_2O_3$ content is more preferably 0.10 mass % or more, still more preferably 0.20 mass % or more. From the viewpoint of further improving the bead shape, it is more preferably 0.70 mass % or less, still more preferably 0.50 mass % or less.

The flux-cored wire preferably contains both $ZrO_2$ and $Al_2O_3$, but it may also be possible to contain only either one thereof.

[Remainder: Fe and Unavoidable Impurities]

The remainder in the composition of components of the flux-cored wire of this embodiment are Fe and unavoidable impurities. Examples of the unavoidable impurities include Sb, As, etc. In addition, the remainder sometimes include an alloying agent such as Ca and Li, a compound thereof, an arc stabilizer, or a slag former. In the case where each of the elements above is added as an oxide or a nitride, the remainder of the flux-cored wire of this embodiment include O or N as well. From the viewpoint of ensuring the deposition amount, the flux-cored wire of this embodiment preferably contains Fe in an amount of 75.00 mass % or more relative to the total mass of the wire. In the case where the Fe content is 75.00 mass % or more, a further sufficient deposition amount is obtained. The Fe content is more preferably 80.00 mass % or more.

As for P, S, Sb, As, etc., not only when contained as unavoidable impurities but also even when added positively, as long as the properties of the present invention are not impaired, the effects of the present invention are not hindered.

In addition, the above-described optional components that are not an essential component may be added positively but may also be contained as unavoidable impurities.

[With respect to $TiO_2$, value of the ratio $\alpha1/\alpha2$ in which $\alpha1$ (mass %) is a content of a particle having a particle size of 106 μm or less relative to the total mass of the wire and $\alpha2$ (mass %) is a content of a particle having a particle size of more than 106 μm relative to the total mass of the wire: 0.90 or more and 1.50 or less]

In this embodiment, in order to keep the diffusible hydrogen content low while appropriately ensuring the welding workability (particularly arc stability), the ratio of particle sizes (particle size ratio) of $TiO_2$ is specified.

The particle size of $TiO_2$ as used herein means a particle diameter of $TiO_2$, and the minor axis of a $TiO_2$ particle after wire drawing is taken as the particle diameter of $TiO_2$.

With respect to $TiO_2$, in the case where the content of a particle having a particle size of 106 μm or less relative to the total mass of the wire is denoted by $\alpha1$ (mass %) and the content of a particle having a particle size of more than 106 μm relative to the total mass of the wire is denoted by $\alpha2$ (mass %), if the value of the ratio $\alpha1/\alpha2$ is less than 0.90, $TiO_2$ melts in a non-uniform manner during welding, giving rise to arc instability. On the other hand, if the value of the ratio $\alpha1/\alpha2$ exceeds 1.50, moisture is readily absorbed due to increase in the surface area of $TiO_2$, and the diffusible hydrogen content in the weld metal increases. For this reason, the value of $\alpha1/\alpha2$ is 0.90 or more and 1.50 or less. From the viewpoint of further enhancing the arc stability, the value of the ratio $\alpha1/\alpha2$ is preferably 1.0 or more, more preferably 1.1 or more. From the viewpoint of decreasing the surface area of $TiO_2$, it is preferably 1.4 or less, more preferably 1.3 or less. As the raw material of $TiO_2$, in addition to $TiO_2$, a Ti oxide such as potassium titanate can be used.

The specified particle size ratio of $TiO_2$ is statistically determined from a large number of experiments.

(Method for Adjusting Particle Size of $TiO_2$)

The particle size of $TiO_2$ can be adjusted, for example, by the following method.

A $TiO_2$ raw material where, relative to the total mass of the $TiO_2$ raw material, the content of a particle having a particle diameter of 106 μm or less is adjusted to be 25 mass % or more and 55 mass % or less and the content of a particle having the particle diameter of more than 106 μm is adjusted to be 45 mass % or more and 75 mass % or less, is used. This TiO$_2$ raw material is added in an amount of 2.0 mass % or more and 10.0 mass % or less relative to the total mass of the wire. Then, as illustrated in (c)→(d) of FIG. 1, the inside of a steel outer sheath 1 is filled with flux 2 containing TiO$_2$ and after forming the steel outer sheath 1 such that the flux is enclosed inside the steel outer sheath 1, the wire is drawn as illustrated in (d)→(e) of FIG. 1. The formed wire is drawn, for example, from a wire diameter of 5.0 mmϕ to 1.2 mmϕ, whereby the TiO$_2$ particle size distribution of the flux enclosed in the flux-cored wire after drawing can be adjusted to fall within the above-described specific range. The TiO$_2$ raw material used for the flux-cored wire of this embodiment can be produced by a conventional method. In addition, the method for adjusting the particle size distribution of the TiO$_2$ raw material to fall within the specific range is not particularly limited, and examples thereof include a method of applying a pulverization treatment and a method of mixing a plurality of kinds of raw materials.

(Method for Measuring Particle Size of TiO$_2$)

The particle size of TiO$_2$ can be measured, for example, by the following method.

Flux is collected from the flux-cored wire after drawing and separated by a sieve in conformity with JIS Z 8801-1: 2006 into (1) a flux component having a particle diameter of 106 μm or less and (2) a flux component having a particle diameter of more than 106 μm by using RPS-105 manufactured by Seishin Enterprise Co., Ltd. As the sieving conditions, a sound wave frequency is 80 Hz, a pulse interval is 1 second, and a classification time is 2 minutes. The content of TiO$_2$ having a particle size of 106 μm or less and the content of TiO$_2$ having a particle size of more than 106 μm can thereby be measured, and the particle size ratio can be calculated from those flux components separated.

Here, the content of TiO$_2$ having a particle size of 106 μm or less and the content of TiO$_2$ having a particle size of more than 106 μm are a value obtained by dissolving each of these separated flux components in aqua regia and analyzing the content of undissolved Ti (acid-insoluble Ti content) by ICP (Inductively Coupled Plasma) method. The acid-insoluble Ti indicates titanium that does not dissolve in aqua regia (a liquid prepared by mixing concentrated hydrochloric acid and concentrated nitric acid at a volume ratio of 3:1).

[Others]

In the flux-cored wire of this embodiment, the steel outer sheath is filled with flux, and the outer diameter (diameter) of the wire is, for example, from 0.9 to 2.0 mm. The flux filling rate may be an arbitrary value as long as each component in the wire falls within the range of the present invention, but in view of wire drawing property and workability (e.g., feedability) during welding, the flux filling rate is preferably from 10 to 20 mass % based on the total mass of the wire.

[Manufacturing Method]

The method for manufacturing the flux-cored wire of this embodiment is not particularly limited but can be manufactured, for example, by the following method. As illustrated in FIG. 1, first, a steel strip constituting a steel outer sheath 1 is prepared ((a) of FIG. 1: first step), the steel strip is formed on a forming roll while feeding it in the longitudinal direction to make a U-shaped open tube ((b) of FIG. 1: second step). Next, the steel outer sheath 1 is filled with flux 2 having blended therein an oxide, a metal or alloy, an Fe powder, etc. each in a predetermined amount ((c) of FIG. 1: third step) and then processed to have a circular cross-section ((d) of FIG. 1: fourth step). The wire is thereafter drawn by cold working to obtain a flux-cored wire 10 having a wire diameter of, for example, from 0.9 to 2.0 mm ((e) of FIG. 1: fifth step). In the middle of cold working, annealing may be applied. In addition, either a seamless wire in which a seam of the formed steel outer sheath 1 is welded in the process of production, or a wire in which the seam above is left to remain as a gap without being welded, can be employed.

EXAMPLES

The effects of the present invention are specifically described below by referring to Examples of the present invention and Comparative Examples.

In these working examples, the flux-cored wires of Examples and Comparative Examples were produced in accordance with the above-described manufacturing method by filling a tubular sheath (diameter: 1.2 mm) formed of a carbon steel having a component composition in the ranges shown in Table 1 below with flux. The remainder of the outer sheath components shown in Table 1 are Fe and unavoidable impurities. At this time, the flux filling rate was adjusted to fall within the range of 13.0 to 14.0 mass % relative to the total mass of the wire.

TABLE 1

| Range of Outer Sheath Components (mass %) | | | | | | | | | | |
|---|---|---|---|---|---|---|---|---|---|---|
| C | Si | Mn | P | S | Cu | Ni | Cr | Ti | Al | B |
| ≤0.10 | ≤0.10 | 0.10 to 0.90 | ≤0.03 | ≤0.03 | ≤0.20 | | ≤0.05 | | ≤0.05 | ≤0.005 |

In Tables 2 and 3 below, the TiO$_2$ particle size ratio of Examples and Comparative Examples and the component composition of the entire wire are shown. The remainder of the wire components shown in Tables 2 and 3 is unavoidable impurities.

In addition, in Tables 2 and 3, "total.Si", "total.B", "total.F", and "total.[Na+K]" mean "the total in terms of Si of at least one of Si and Si oxide", "the total in terms of B of B and B compound", "the total in terms of F of F compound", and "the sum total of the total in terms of Na of Na compound and the total in terms of K of K compound", respectively. The "sol.Ti" and "sol.Mg" mean "the total in terms of Ti of metal Ti and Ti alloy" and "the total in terms of Mg of metal Mg and Mg alloy", respectively.

Furthermore, in Tables 2 and 3, as for those not satisfying the ranges of the present invention, and with respect to optional components and Fe, those not satisfying the preferable ranges, the numerical value is indicated by underlining.

TABLE 2

| No. | TiO$_2$ particle size ratio | Wire Component (mass %) | | | | | | | | | |
|---|---|---|---|---|---|---|---|---|---|---|---|
| | | C | P | S | Mn | Ni | TiO$_2$ total. | Si | Cr | Cu | sol. Ti | sol. Mg |
| 1 | 1.15 | 0.07 | 0.006 | 0.002 | 1.6 | 2.10 | 5.2 | 0.43 | 0.00 | 0.00 | 0.14 | 0.47 |
| 2 | 0.97 | 0.05 | 0.007 | 0.003 | 2.7 | 0.98 | 6.2 | 0.45 | 0.00 | 0.00 | 0.14 | 0.46 |
| 3 | 1.15 | 0.05 | 0.008 | 0.003 | 2.2 | 0.78 | 5.5 | 0.46 | 0.01 | 0.00 | 0.14 | 0.40 |
| 4 | 1.10 | 0.11 | 0.002 | 0.003 | 1.6 | 4.11 | 4.0 | 0.00 | 0.00 | 0.00 | 0.00 | 0.00 |
| 5 | 1.14 | 0.08 | 0.008 | 0.002 | 1.2 | 2.55 | 4.6 | 0.00 | 0.00 | 0.00 | 0.00 | 0.00 |
| 6 | 1.34 | 0.11 | 0.006 | 0.028 | 4.3 | 0.57 | 6.7 | 0.23 | 0.03 | 0.01 | 0.69 | 0.78 |
| 7 | 1.24 | 0.07 | 0.020 | 0.031 | 3.5 | 2.58 | 3.2 | 0.78 | 0.03 | 0.02 | 0.28 | 0.11 |
| 8 | 1.50 | 0.07 | 0.014 | 0.020 | 3.7 | 4.44 | 9.3 | 0.35 | 0.02 | 0.04 | 0.66 | 0.95 |
| 9 | 0.91 | 0.10 | 0.017 | 0.008 | 3.0 | 2.80 | 6.4 | 0.57 | 0.04 | 0.02 | 0.47 | 0.54 |
| 10 | 0.94 | 0.19 | 0.007 | 0.020 | 0.7 | 1.62 | 8.7 | 0.60 | 0.01 | 0.04 | 0.18 | 0.64 |
| 11 | 1.30 | 0.02 | 0.014 | 0.033 | 1.5 | 2.54 | 7.9 | 0.86 | 0.03 | 0.01 | 0.25 | 0.79 |
| 12 | 1.26 | 0.03 | 0.040 | 0.011 | 4.7 | 0.57 | 8.2 | 0.13 | 0.02 | 0.04 | 0.09 | 0.41 |
| 13 | 1.35 | 0.12 | 0.000 | 0.022 | 4.0 | 4.42 | 5.2 | 0.35 | 0.04 | 0.01 | 0.22 | 0.98 |
| 14 | 0.98 | 0.10 | 0.003 | 0.050 | 3.2 | 2.31 | 7.8 | 0.85 | 0.00 | 0.03 | 0.22 | 0.85 |
| 15 | 1.05 | 0.06 | 0.024 | 0.000 | 3.7 | 3.04 | 5.0 | 0.88 | 0.04 | 0.02 | 0.47 | 0.19 |
| 16 | 1.12 | 0.04 | 0.018 | 0.019 | 4.9 | 4.26 | 7.3 | 0.84 | 0.03 | 0.03 | 0.39 | 0.86 |
| 17 | 0.97 | 0.07 | 0.026 | 0.026 | 0.6 | 4.56 | 4.7 | 0.75 | 0.04 | 0.04 | 0.48 | 0.39 |
| 18 | 1.25 | 0.06 | 0.028 | 0.025 | 2.4 | 4.99 | 4.3 | 0.09 | 0.02 | 0.01 | 0.54 | 0.87 |
| 19 | 0.98 | 0.06 | 0.012 | 0.032 | 4.8 | 0.10 | 7.5 | 0.56 | 0.03 | 0.02 | 0.14 | 0.88 |
| 20 | 0.94 | 0.11 | 0.029 | 0.003 | 3.5 | 3.21 | 9.9 | 0.40 | 0.01 | 0.02 | 0.46 | 0.94 |
| 21 | 1.18 | 0.09 | 0.023 | 0.030 | 1.2 | 3.98 | 2.2 | 0.28 | 0.01 | 0.01 | 0.47 | 0.18 |
| 22 | 0.95 | 0.14 | 0.028 | 0.018 | 2.9 | 0.68 | 8.7 | 0.98 | 0.03 | 0.02 | 0.68 | 0.27 |
| 23 | 0.99 | 0.05 | 0.019 | 0.013 | 1.2 | 2.66 | 5.3 | 0.06 | 0.03 | 0.01 | 0.34 | 0.89 |
| 24 | 1.13 | 0.08 | 0.003 | 0.006 | 1.0 | 2.44 | 4.5 | 0.77 | 0.49 | 0.00 | 0.41 | 0.50 |
| 25 | 1.28 | 0.17 | 0.007 | 0.017 | 1.4 | 3.02 | 3.7 | 0.19 | 0.00 | 0.00 | 0.52 | 0.60 |
| 26 | 1.18 | 0.07 | 0.011 | 0.009 | 3.1 | 2.96 | 2.8 | 0.63 | 0.04 | 0.48 | 0.67 | 0.78 |
| 27 | 1.41 | 0.15 | 0.028 | 0.002 | 1.6 | 3.00 | 3.6 | 0.20 | 0.01 | 0.00 | 0.22 | 0.12 |
| 28 | 1.38 | 0.09 | 0.010 | 0.011 | 4.4 | 4.40 | 7.5 | 0.12 | 0.04 | 0.00 | 0.80 | 0.49 |
| 29 | 1.07 | 0.14 | 0.021 | 0.002 | 1.9 | 4.65 | 8.2 | 0.07 | 0.03 | 0.04 | 0.00 | 0.45 |
| 30 | 1.07 | 0.05 | 0.021 | 0.002 | 2.2 | 3.50 | 8.8 | 0.07 | 0.40 | 0.05 | 0.62 | 1.15 |
| 31 | 1.42 | 0.05 | 0.022 | 0.004 | 1.5 | 2.20 | 8.4 | 0.05 | 0.05 | 0.04 | 0.44 | 0.12 |
| 32 | 1.15 | 0.06 | 0.010 | 0.005 | 1.8 | 2.60 | 9.5 | 0.05 | 0.03 | 0.04 | 0.35 | 0.80 |
| 33 | 1.02 | 0.05 | 0.015 | 0.006 | 1.6 | 3.20 | 2.5 | 0.05 | 0.03 | 0.04 | 0.25 | 0.60 |
| 34 | 0.96 | 0.11 | 0.015 | 0.006 | 3.6 | 0.21 | 8.8 | 0.09 | 0.03 | 0.02 | 0.26 | 0.65 |
| 35 | 1.19 | 0.04 | 0.018 | 0.001 | 1.7 | 0.69 | 8.6 | 0.21 | 0.04 | 0.00 | 0.09 | 0.98 |
| 36 | 0.96 | 0.14 | 0.021 | 0.014 | 1.8 | 2.08 | 7.2 | 0.50 | 0.04 | 0.03 | 0.51 | 0.60 |
| 37 | 1.02 | 0.09 | 0.027 | 0.025 | 3.5 | 4.18 | 7.8 | 0.62 | 0.01 | 0.03 | 0.05 | 0.74 |
| 38 | 1.10 | 0.11 | 0.012 | 0.025 | 4.0 | 2.61 | 8.3 | 0.41 | 0.03 | 0.04 | 0.49 | 0.60 |
| 39 | 1.28 | 0.06 | 0.028 | 0.006 | 2.4 | 1.84 | 4.1 | 0.50 | 0.04 | 0.01 | 0.61 | 1.05 |
| 40 | 1.24 | 0.06 | 0.002 | 0.032 | 1.2 | 4.33 | 3.1 | 0.44 | 0.02 | 0.04 | 0.33 | 0.14 |
| 41 | 1.37 | 0.08 | 0.012 | 0.021 | 1.9 | 0.61 | 3.6 | 0.38 | 0.02 | 0.01 | 0.71 | 0.58 |
| 42 | 0.97 | 0.13 | 0.017 | 0.014 | 0.9 | 3.22 | 2.7 | 0.79 | 0.03 | 0.01 | 0.67 | 0.34 |

| No. | Mo | total. B | total. F | total. [Na + K] | Nb | V | ZrO$_2$ | Al$_2$O$_3$ | Fe |
|---|---|---|---|---|---|---|---|---|---|
| 1 | 0.00 | 0.0080 | 0.11 | 0.12 | 0.03 | 0.00 | 0.06 | 0.24 | 89.41 |
| 2 | 0.00 | 0.0077 | 0.16 | 0.16 | 0.00 | 0.00 | 0.00 | 0.28 | 88.40 |
| 3 | 0.40 | 0.0090 | 0.15 | 0.16 | 0.01 | 0.02 | 0.06 | 0.05 | 89.59 |
| 4 | 0.00 | 0.0000 | 0.00 | 0.00 | 0.00 | 0.00 | 0.00 | 0.00 | 90.17 |
| 5 | 0.00 | 0.0000 | 0.00 | 0.00 | 0.00 | 0.00 | 0.00 | 0.00 | 91.56 |
| 6 | 0.26 | 0.0051 | 0.28 | 0.49 | 0.02 | 0.02 | 0.03 | 0.58 | 84.86 |
| 7 | 0.23 | 0.0096 | 0.15 | 0.56 | 0.03 | 0.02 | 0.07 | 0.76 | 87.54 |
| 8 | 0.29 | 0.0102 | 0.24 | 0.50 | 0.02 | 0.01 | 0.04 | 0.21 | 79.11 |
| 9 | 0.27 | 0.0052 | 0.19 | 0.62 | 0.01 | 0.02 | 0.04 | 0.67 | 84.21 |
| 10 | 0.27 | 0.0130 | 0.37 | 0.64 | 0.01 | 0.02 | 0.04 | 0.37 | 85.56 |
| 11 | 0.04 | 0.0111 | 0.33 | 0.56 | 0.03 | 0.03 | 0.07 | 0.61 | 84.37 |
| 12 | 0.27 | 0.0084 | 0.13 | 0.50 | 0.01 | 0.02 | 0.07 | 0.82 | 83.93 |
| 13 | 0.25 | 0.0056 | 0.27 | 0.47 | 0.02 | 0.02 | 0.08 | 0.67 | 82.85 |
| 14 | 0.26 | 0.0111 | 0.27 | 0.54 | 0.01 | 0.02 | 0.02 | 0.57 | 82.88 |
| 15 | 0.30 | 0.0056 | 0.21 | 0.44 | 0.02 | 0.02 | 0.05 | 0.60 | 84.93 |
| 16 | 0.33 | 0.0074 | 0.18 | 0.42 | 0.03 | 0.03 | 0.06 | 0.12 | 80.13 |
| 17 | 0.18 | 0.0141 | 0.41 | 0.49 | 0.03 | 0.01 | 0.05 | 0.79 | 86.34 |
| 18 | 0.36 | 0.0079 | 0.25 | 0.45 | 0.02 | 0.02 | 0.05 | 0.28 | 85.22 |
| 19 | 0.33 | 0.0130 | 0.14 | 0.68 | 0.03 | 0.02 | 0.08 | 0.32 | 84.25 |
| 20 | 0.01 | 0.0100 | 0.40 | 0.49 | 0.01 | 0.03 | 0.02 | 0.78 | 79.67 |
| 21 | 0.33 | 0.0070 | 0.16 | 0.56 | 0.01 | 0.01 | 0.07 | 0.59 | 89.79 |
| 22 | 0.07 | 0.0071 | 0.07 | 0.50 | 0.02 | 0.02 | 0.07 | 0.84 | 83.95 |
| 23 | 0.20 | 0.0081 | 0.18 | 0.63 | 0.01 | 0.02 | 0.06 | 0.58 | 87.74 |
| 24 | 0.16 | 0.0124 | 0.28 | 0.42 | 0.02 | 0.01 | 0.08 | 0.16 | 88.65 |
| 25 | 0.19 | 0.0050 | 0.35 | 0.70 | 0.01 | 0.02 | 0.02 | 0.56 | 88.52 |
| 26 | 0.38 | 0.0128 | 0.44 | 0.61 | 0.02 | 0.02 | 0.03 | 0.84 | 86.09 |
| 27 | 0.17 | 0.0131 | 0.12 | 0.55 | 0.02 | 0.02 | 0.02 | 0.66 | 89.49 |
| 28 | 0.39 | 0.0069 | 0.33 | 0.49 | 0.02 | 0.01 | 0.06 | 0.63 | 80.20 |
| 29 | 0.23 | 0.0085 | 0.37 | 0.60 | 0.02 | 0.01 | 0.04 | 0.75 | 82.46 |

TABLE 2-continued

| | | | | | | | | | |
|---|---|---|---|---|---|---|---|---|---|
| 30 | 0.20 | 0.0085 | 0.36 | 0.50 | 0.06 | 0.06 | 0.02 | 0.85 | 81.07 |
| 31 | 0.35 | 0.0100 | 0.33 | 0.49 | 0.04 | 0.04 | 0.05 | 0.48 | 85.33 |
| 32 | 0.49 | 0.0150 | 0.35 | 0.64 | 0.04 | 0.01 | 0.03 | 0.69 | 82.49 |
| 33 | 0.00 | 0.0140 | 0.45 | 0.64 | 0.02 | 0.04 | 0.01 | 0.36 | 90.12 |
| 34 | 0.03 | 0.0190 | 0.20 | 0.58 | 0.02 | 0.03 | 0.07 | 0.83 | 84.43 |
| 35 | 0.05 | 0.0020 | 0.39 | 0.49 | 0.01 | 0.03 | 0.07 | 0.46 | 86.12 |
| 36 | 0.23 | 0.0058 | 0.48 | 0.41 | 0.02 | 0.01 | 0.05 | 0.39 | 85.46 |
| 37 | 0.12 | 0.0081 | 0.02 | 0.51 | 0.02 | 0.01 | 0.02 | 0.80 | 81.42 |
| 38 | 0.08 | 0.0072 | 0.23 | 0.98 | 0.03 | 0.01 | 0.04 | 0.33 | 81.66 |
| 39 | 0.24 | 0.0089 | 0.24 | 0.02 | 0.02 | 0.02 | 0.08 | 0.39 | 88.33 |
| 40 | 0.00 | 0.0036 | 0.28 | 0.42 | 0.09 | 0.03 | 0.05 | 0.11 | 89.32 |
| 41 | 0.16 | 0.0121 | 0.20 | 0.65 | 0.00 | 0.02 | 0.02 | 0.48 | 90.53 |
| 42 | 0.10 | 0.0059 | 0.33 | 0.66 | 0.02 | 0.09 | 0.06 | 0.42 | 89.49 |

TABLE 3

| No. | $TiO_2$ Particle Size Ratio | Wire Component (mass %) | | | | | | | | | |
|---|---|---|---|---|---|---|---|---|---|---|---|
| | | C | P | S | Mn | Ni | $TiO_2$ | total. Si | Cr | Cu | sol. Ti | sol. Mg |
| 43 | 1.00 | 0.03 | 0.011 | 0.015 | 4.4 | 4.28 | 3.3 | 0.27 | 0.02 | 0.03 | 0.44 | 1.15 |
| 44 | 1.23 | 0.07 | 0.011 | 0.012 | 2.7 | 0.15 | 4.6 | 0.42 | 0.01 | 0.01 | 0.65 | 0.99 |
| 45 | 1.00 | 0.07 | 0.003 | 0.011 | 2.5 | 3.85 | 6.8 | 0.79 | 0.02 | 0.03 | 0.28 | 0.62 |
| 46 | 1.32 | 0.04 | 0.013 | 0.028 | 2.7 | 0.50 | 8.4 | 0.49 | 0.02 | 0.04 | 0.23 | 0.89 |
| 47 | 0.94 | 0.13 | 0.007 | 0.014 | 2.2 | 2.74 | 3.0 | 0.17 | 0.02 | 0.04 | 0.25 | 0.84 |
| 48 | 1.01 | 0.14 | 0.011 | 0.014 | 3.3 | 0.51 | 8.1 | 0.07 | 0.00 | 0.04 | 0.44 | 1.14 |
| 49 | 1.05 | 0.09 | 0.015 | 0.014 | 2.6 | 2.79 | 6.3 | 0.26 | 0.01 | 0.01 | 0.21 | 0.60 |
| 50 | 1.60 | 0.03 | 0.030 | 0.028 | 0.9 | 3.53 | 7.9 | 0.25 | 0.02 | 0.02 | 0.14 | 0.43 |
| 51 | 0.80 | 0.13 | 0.002 | 0.005 | 1.0 | 4.26 | 2.6 | 0.14 | 0.01 | 0.03 | 0.43 | 0.27 |
| 52 | 1.41 | 0.22 | 0.014 | 0.033 | 2.7 | 2.16 | 2.9 | 0.84 | 0.00 | 0.00 | 0.60 | 0.20 |
| 53 | 0.97 | 0.00 | 0.023 | 0.006 | 4.7 | 0.85 | 2.3 | 0.73 | 0.04 | 0.01 | 0.69 | 0.13 |
| 54 | 0.99 | 0.06 | 0.060 | 0.012 | 3.5 | 0.70 | 6.4 | 0.21 | 0.01 | 0.01 | 0.62 | 0.81 |
| 55 | 1.41 | 0.07 | 0.029 | 0.060 | 2.0 | 1.69 | 4.0 | 0.44 | 0.03 | 0.02 | 0.48 | 0.62 |
| 56 | 1.33 | 0.07 | 0.014 | 0.005 | 5.2 | 0.81 | 9.2 | 0.47 | 0.01 | 0.03 | 0.46 | 0.38 |
| 57 | 1.40 | 0.03 | 0.002 | 0.014 | 0.4 | 2.02 | 8.3 | 0.07 | 0.01 | 0.03 | 0.42 | 0.62 |
| 58 | 1.01 | 0.11 | 0.016 | 0.003 | 2.9 | 5.11 | 4.0 | 0.79 | 0.03 | 0.03 | 0.67 | 0.80 |
| 59 | 1.18 | 0.06 | 0.024 | 0.030 | 4.2 | 0.00 | 3.2 | 0.65 | 0.03 | 0.01 | 0.21 | 0.83 |
| 60 | 0.94 | 0.07 | 0.002 | 0.021 | 2.2 | 1.38 | 11.2 | 0.89 | 0.03 | 0.02 | 0.69 | 0.14 |
| 61 | 1.01 | 0.06 | 0.007 | 0.015 | 2.7 | 3.60 | 1.8 | 0.64 | 0.03 | 0.03 | 0.16 | 0.37 |
| 62 | 1.55 | 0.03 | 0.010 | 0.010 | 2.3 | 1.00 | 5.5 | 0.34 | 0.00 | 0.30 | 0.10 | 0.50 |
| 63 | 1.13 | 0.05 | 0.029 | 0.029 | 1.6 | 3.59 | 7.5 | 1.05 | 0.02 | 0.01 | 0.40 | 0.90 |
| 64 | 1.07 | 0.03 | 0.013 | 0.005 | 2.1 | 1.90 | 4.8 | 0.04 | 0.01 | 0.04 | 0.10 | 0.58 |
| 65 | 1.05 | 0.12 | 0.030 | 0.015 | 4.1 | 2.55 | 3.5 | 0.27 | 0.52 | 0.02 | 0.57 | 0.96 |
| 66 | 1.42 | 0.17 | 0.030 | 0.009 | 1.0 | 4.35 | 9.4 | 0.09 | 0.00 | 0.51 | 0.08 | 0.53 |
| 67 | 1.12 | 0.10 | 0.022 | 0.013 | 1.1 | 4.61 | 8.4 | 0.57 | 0.02 | 0.03 | 0.84 | 1.00 |
| 68 | 1.25 | 0.05 | 0.030 | 0.040 | 2.5 | 3.54 | 8.8 | 0.54 | 0.25 | 0.42 | 0.75 | 1.25 |
| 69 | 0.99 | 0.09 | 0.050 | 0.025 | 2.4 | 3.65 | 2.9 | 0.49 | 0.25 | 0.37 | 0.46 | 0.09 |
| 70 | 1.35 | 0.10 | 0.040 | 0.020 | 2.7 | 3.95 | 8.5 | 0.36 | 0.35 | 0.33 | 0.70 | 1.15 |
| 71 | 1.14 | 0.16 | 0.002 | 0.028 | 4.3 | 2.20 | 2.5 | 0.46 | 0.02 | 0.26 | 0.64 | 0.97 |
| 72 | 1.38 | 0.02 | 0.028 | 0.008 | 4.6 | 4.73 | 9.3 | 0.53 | 0.02 | 0.03 | 0.47 | 0.62 |
| 73 | 1.21 | 0.15 | 0.018 | 0.020 | 1.9 | 1.25 | 7.5 | 0.45 | 0.01 | 0.00 | 0.60 | 0.83 |
| 74 | 1.41 | 0.16 | 0.014 | 0.001 | 4.0 | 0.20 | 4.4 | 0.89 | 0.03 | 0.04 | 0.22 | 0.91 |
| 75 | 0.93 | 0.13 | 0.021 | 0.023 | 1.2 | 3.42 | 3.4 | 0.46 | 0.01 | 0.02 | 0.22 | 1.03 |
| 76 | 1.04 | 0.16 | 0.009 | 0.030 | 0.9 | 3.94 | 5.1 | 0.89 | 0.03 | 0.01 | 0.22 | 1.01 |
| 77 | 1.33 | 0.12 | 0.020 | 0.019 | 4.5 | 1.95 | 5.2 | 0.70 | 0.04 | 0.04 | 0.29 | 0.73 |
| 78 | 1.31 | 0.13 | 0.014 | 0.012 | 4.4 | 0.10 | 9.5 | 0.14 | 0.03 | 0.04 | 0.54 | 0.32 |
| 79 | 1.33 | 0.14 | 0.007 | 0.019 | 3.6 | 2.15 | 5.0 | 0.09 | 0.04 | 0.03 | 0.44 | 0.21 |
| 80 | 1.17 | 0.04 | 0.025 | 0.025 | 4.7 | 4.29 | 3.4 | 0.91 | 0.02 | 0.04 | 0.69 | 0.88 |
| 81 | 1.12 | 0.15 | 0.030 | 0.007 | 0.7 | 1.00 | 8.8 | 0.22 | 0.01 | 0.03 | 0.12 | 0.47 |
| 82 | 1.16 | 0.03 | 0.026 | 0.020 | 4.5 | 4.90 | 10.0 | 0.95 | 0.43 | 0.43 | 0.75 | 1.10 |

| No. | Mo | total. B | total. F | total. [Na + K] | Nb | V | $ZrO_2$ | $Al_2O_3$ | Fe |
|---|---|---|---|---|---|---|---|---|---|
| 43 | 0.15 | 0.0082 | 0.23 | 0.71 | 0.01 | 0.00 | 0.05 | 0.79 | 84.10 |
| 44 | 0.21 | 0.0079 | 0.28 | 0.44 | 0.02 | 0.02 | 0.49 | 0.63 | 88.27 |
| 45 | 0.17 | 0.0143 | 0.41 | 0.57 | 0.02 | 0.01 | 0.00 | 0.73 | 83.10 |
| 46 | 0.22 | 0.0034 | 0.37 | 0.63 | 0.02 | 0.03 | 0.01 | 0.90 | 84.46 |
| 47 | 0.37 | 0.0129 | 0.23 | 0.50 | 0.02 | 0.01 | 0.02 | 0.06 | 89.36 |
| 48 | 0.15 | 0.0060 | 0.25 | 0.46 | 0.02 | 0.02 | 0.05 | 0.76 | 84.51 |
| 49 | 0.33 | 0.0056 | 0.22 | 0.56 | 0.03 | 0.02 | 0.04 | 0.54 | 85.35 |
| 50 | 0.09 | 0.0095 | 0.38 | 0.61 | 0.02 | 0.01 | 0.03 | 0.81 | 84.76 |
| 51 | 0.14 | 0.0040 | 0.40 | 0.49 | 0.02 | 0.03 | 0.03 | 0.65 | 89.35 |
| 52 | 0.22 | 0.0083 | 0.09 | 0.53 | 0.02 | 0.01 | 0.08 | 0.60 | 88.77 |
| 53 | 0.16 | 0.0060 | 0.45 | 0.54 | 0.01 | 0.03 | 0.05 | 0.37 | 88.90 |
| 54 | 0.15 | 0.0133 | 0.34 | 0.68 | 0.02 | 0.02 | 0.07 | 0.72 | 85.59 |

TABLE 3-continued

| | | | | | | | | | |
|---|---|---|---|---|---|---|---|---|---|
| 55 | 0.24 | 0.0035 | 0.25 | 0.67 | 0.02 | 0.03 | 0.06 | 0.14 | 89.14 |
| 56 | 0.08 | 0.0064 | 0.09 | 0.65 | 0.03 | 0.02 | 0.01 | 0.16 | 82.30 |
| 57 | 0.03 | 0.0148 | 0.21 | 0.60 | 0.01 | 0.03 | 0.06 | 0.66 | 86.46 |
| 58 | 0.35 | 0.0096 | 0.10 | 0.56 | 0.03 | 0.03 | 0.08 | 0.46 | 83.92 |
| 59 | 0.28 | 0.0149 | 0.31 | 0.45 | 0.03 | 0.02 | 0.01 | 0.78 | 88.86 |
| 60 | 0.33 | 0.0079 | 0.34 | 0.45 | 0.01 | 0.03 | 0.08 | 0.32 | 81.78 |
| 61 | 0.20 | 0.0062 | 0.25 | 0.46 | 0.01 | 0.02 | 0.07 | 0.48 | 89.09 |
| 62 | 0.00 | 0.0080 | 0.68 | 0.17 | 0.00 | 0.00 | 0.00 | 0.10 | 88.95 |
| 63 | 0.14 | 0.0145 | 0.35 | 0.46 | 0.03 | 0.02 | 0.05 | 0.22 | 83.53 |
| 64 | 0.22 | 0.0110 | 0.10 | 0.53 | 0.02 | 0.02 | 0.02 | 0.16 | 89.30 |
| 65 | 0.21 | 0.0088 | 0.15 | 0.68 | 0.02 | 0.02 | 0.04 | 0.82 | 85.39 |
| 66 | 0.20 | 0.0127 | 0.23 | 0.66 | 0.02 | 0.02 | 0.03 | 0.14 | 82.51 |
| 67 | 0.38 | 0.0047 | 0.29 | 0.53 | 0.01 | 0.02 | 0.03 | 0.19 | 81.84 |
| 68 | 0.21 | 0.0015 | 0.44 | 0.26 | 0.08 | 0.01 | 0.40 | 0.28 | 80.14 |
| 69 | 0.06 | 0.0023 | 0.06 | 0.22 | 0.05 | 0.02 | 0.35 | 0.50 | 87.96 |
| 70 | 0.55 | 0.0022 | 0.04 | 0.60 | 0.01 | 0.08 | 0.33 | 0.20 | 79.98 |
| 71 | 0.39 | 0.0250 | 0.17 | 0.62 | 0.01 | 0.02 | 0.06 | 0.38 | 86.78 |
| 72 | 0.36 | 0.0006 | 0.44 | 0.46 | 0.02 | 0.02 | 0.06 | 0.23 | 78.05 |
| 73 | 0.22 | 0.0040 | 0.55 | 0.48 | 0.02 | 0.03 | 0.04 | 0.50 | 85.42 |
| 74 | 0.02 | 0.0046 | 0.00 | 0.69 | 0.02 | 0.01 | 0.07 | 0.73 | 87.59 |
| 75 | 0.04 | 0.0149 | 0.20 | 1.11 | 0.02 | 0.03 | 0.06 | 0.78 | 87.81 |
| 76 | 0.17 | 0.0124 | 0.11 | 0.004 | 0.02 | 0.01 | 0.04 | 0.75 | 86.58 |
| 77 | 0.21 | 0.0119 | 0.13 | 0.48 | 0.11 | 0.03 | 0.04 | 0.22 | 85.15 |
| 78 | 0.04 | 0.0069 | 0.36 | 0.68 | 0.02 | 0.12 | 0.08 | 0.52 | 82.94 |
| 79 | 0.01 | 0.0061 | 0.23 | 0.69 | 0.03 | 0.01 | 0.52 | 0.41 | 86.36 |
| 80 | 0.15 | 0.0145 | 0.06 | 0.56 | 0.01 | 0.03 | 0.01 | 1.10 | 83.04 |
| 81 | 0.15 | 0.0090 | 0.13 | 0.56 | 0.01 | 0.02 | 0.08 | 0.04 | 87.46 |
| 82 | 0.45 | 0.0150 | 0.42 | 0.95 | 0.02 | 0.01 | 0.40 | 0.95 | 73.64 |

Next, gas-shielded arc welding was performed on the base metal shown in Table 4 below by using each of the flux-cored wires of Examples and Comparative Examples. The remainder of the base metal composition shown in Table 4 are Fe and unavoidable impurities.

TABLE 4

| Base metal | Sheet Thickness (mm) | Component Composition (mass %) | | | | |
|---|---|---|---|---|---|---|
| | | C | Si | Mn | P | S |
| JIS G 3106 SM490A | 20 | 0.14 | 0.18 | 1.08 | 0.01 | 0.001 |

The welding conditions are as follows.
Shielding gas: 80 vol % Ar-20 vol % $CO_2$, 25 liters/min
Wire diameter: 1.2 mm$\phi$
Welding position: flat
Groove shape: 20° V
Groove gap: 16 mm
Welding current: 280 A
Arc voltage: 29 V
Melding speed: 350 mm/min With respect to the weld metal obtained by gas-shielded arc welding using each of the flux-cored wires of Examples and Comparative Examples, the mechanical properties and the blow-hole resistance (defect resistance) were evaluated by the following methods.

<Mechanical Properties>

The mechanical properties of the weld metal were evaluated by the tensile test and impact test in conformity with "Methods for Tensile and Impact Tests of Weld Metal" specified in JIS Z 3111:2005. The low-temperature toughness was judged as Passed when the impact value at −80° C. (CVN-80) was 42.0 J or more and the impact value at −50° C. (CVN-50) was 47.0 J or more. The 0.2% yield strength (0.2% PS) was judged as Passed when it was 500 MPa or more. Furthermore, the tensile strength (TS) was judged as Passed when it was from 580 to 760 MPa.

<Blow-Hole Resistance>

The blow-hole resistance was evaluated by Radiographic Examination of JIS Z 3104:1995 after removing excessive weld metal and backing metal of a weld metal specimen. The specimen was rated A when a blow hole was not generated in a weld length of 300 mm, rated B when blow holes of less than 3 mm were generated in the range of 1 or more and 3 or less in terms of Number, and rated C when blow holes of less than 3 mm were generated in the range of more than 3 in terms of Number or blow holes of 3 mm or more were generated, and those rated A or B were judged as Passed.

With respect to each of the flux-cored wires of Examples and Comparative Examples, the diffusible hydrogen content (cold cracking resistance) and the hot cracking resistance were evaluated by the following methods.

<Diffusible Hydrogen Content>

The diffusible hydrogen content in the weld metal was evaluated by the method in conformity with JIS Z 3118: 2007. The base metal used is shown in Table 4. Those where the diffusible hydrogen content ([H]d) was 5.0 ml/100 g or less were judged as Passed.

<Hot Cracking Resistance>

The hot cracking resistance was evaluated based on "Method of FISCO test" specified in JIS Z 3155:1993. The base metal used is shown in Table 4. The hot cracking resistance was rated A when the cracking rate was 0%, rated B when the cracking rate was more than 0% and less than 10%, and rated C when the cracking rate was 10% or more. Those rated C were judged as impracticable, and those rated A and B were judged as Passed.

In the test of hot cracking resistance, the welding conditions were as follows.
Shielding gas: 80 vol % Ar-20 vol % $CO_2$, 25 liters/min
Wire diameter: 1.2 mm$\phi$
Welding position: flat
Groove shape: 90° Y
Groove gap: 4 mm
Welding current: 200 A
Arc voltage: 20 V
Welding speed: 200 mm/min Adjustment of the particle size of $TiO_2$ and measurement of the particle size were performed as follows.

(Method for Adjusting Particle Size of $TiO_2$)

Adjustment of the particle size of $TiO_2$ was performed by the following method.

A $TiO_2$ raw material in which the content of a particle having a particle diameter of 106 μm or less was adjusted to be 25 mass % or more and 55 mass % or less and the content of a particle of more than 106 μm was adjusted to be 45 mass % or more and 75 mass % or less, relative to the total mass of the $TiO_2$ raw material, was used. This $TiO_2$ raw material was added in an amount 2.0 mass % or more and 10.0 mass % or less relative to the total mass of the wire. Then, as illustrated in (c)→(d) of FIG. 1, the inside of a steel outer sheath 1 was filled with flux 2 containing $TiO_2$ and after forming the steel outer sheath 1 such that the flux was enclosed inside the steel outer sheath 1, the wire was drawn as illustrated in (d)→(e) of FIG. 1. The formed wire was drawn from a wire diameter of 5.0 mmϕ to 1.2 mmϕ, whereby the $TiO_2$ particle size distribution of the flux enclosed in the flux-cored wire after drawing was adjusted to fall within the specific range.

(Method for Measuring Particle Size of $TiO_2$)

The particle size of $TiO_2$ was measured by the following method.

Flux was collected from the flux-cored wire after drawing and separated by a sieve having an opening of 106 μm in conformity with JIS Z 8801-1:2006 into (1) a flux component having a particle diameter of 106 μm or less and (2) a flux component having a particle diameter of more than 106 μm by using RPS-10.5 manufactured by Seishin Enterprise Co., Ltd. As the sieving conditions, a sound wave frequency was 80 Hz, a pulse interval was 1 second, and a classification time was 2 minutes. The content of $TiO_2$ having a particle size of 106 μm or less and the content of $TiO_2$ having a particle size of more than 106 μm were thereby measured, and the particle size ratio was calculated from those flux components separated.

With respect to each of the flux-cored wires of Examples and Comparative Examples, the welding workability was evaluated by the following method.

<Welding Workability>

The welding workability was evaluated as follows by performing vertical up fillet welding on the base metal shown in Table 4. The welding workability was rated A when the height of the convex part was less than 2 mm relative to a smooth fillet bead, rated B when the height of the convex part was 2 mm or more and less than 3 mm, and rated C when the height of the convex part was 3 mm or more, when slag or molten metal dripped and welding could not be performed, or when the bead surface took on a concave shape, and those rated A and B were judged as Passed.

In the test of welding workability, the welding conditions were as follows.

Shielding gas: 80 vol % Ar-20 vol % $CO_2$, 25 liters/min
Wire diameter: 1.2 mmϕ
Groove gap: 0 mm
Welding current: 220 A
Arc voltage: 24 V
Welding speed: 150 mm/min
Weaving width: 10 mm The results of these evaluations are shown together in Tables 5 and 6. In Tables 5 and 6, as for those not satisfying the evaluation criteria on the mechanical properties and the diffusible hydrogen content, the numerical value is indicated by underlining.

TABLE 5

| No. | CVN-80 (J) | CVN-50 (J) | 0.2% PS (MPa) | TS (MPa) | [H]d (ml/100 g) | Workability VUF | Hot Cracking (FISCO cracking) | X-Ray (Blow hole) |
|---|---|---|---|---|---|---|---|---|
| 1 | 97.0 | 116.0 | 518 | 606 | 3.4 | A | A | A |
| 2 | 48.0 | 72.0 | 663 | 739 | 3.9 | A | A | A |
| 3 | 54.0 | 84.0 | 611 | 670 | 3.3 | A | A | A |
| 4 | 55.0 | 49.0 | 515 | 588 | 4.0 | B | B | B |
| 5 | 48.0 | 58.0 | 524 | 598 | 4.5 | B | B | B |
| 6 | 45.0 | 50.0 | 589 | 740 | 3.5 | A | A | A |
| 7 | 65.0 | 75.0 | 590 | 760 | 2.9 | A | B | A |
| 8 | 61.0 | 72.6 | 532 | 665 | 4.9 | A | A | A |
| 9 | 70.0 | 80.0 | 519 | 680 | 3.5 | B | A | A |
| 10 | 42.0 | 48.0 | 604 | 756 | 3.5 | A | A | A |
| 11 | 90.0 | 125.0 | 502 | 589 | 3.9 | A | A | A |
| 12 | 55.0 | 72.0 | 533 | 645 | 3.1 | A | B | A |
| 13 | 65.0 | 79.0 | 554 | 672 | 3.0 | A | A | A |
| 14 | 58.0 | 78.0 | 536 | 658 | 3.5 | A | B | A |
| 15 | 64.0 | 75.0 | 547 | 664 | 2.9 | A | A | A |
| 16 | 43.0 | 49.0 | 630 | 758 | 2.8 | A | A | A |
| 17 | 68.0 | 80.0 | 539 | 650 | 3.2 | A | A | B |
| 18 | 58.0 | 77.0 | 537 | 644 | 2.9 | A | B | A |
| 19 | 42.0 | 48.0 | 605 | 760 | 2.8 | A | A | A |
| 20 | 45.0 | 52.0 | 600 | 740 | 3.4 | A | A | A |
| 21 | 85.0 | 120.0 | 555 | 629 | 2.1 | B | A | A |
| 22 | 62.0 | 50.0 | 629 | 655 | 3.0 | A | A | A |
| 23 | 69.0 | 79.0 | 539 | 648 | 3.2 | A | A | A |
| 24 | 78.0 | 89.0 | 577 | 645 | 3.0 | A | A | A |
| 25 | 98.0 | 108.0 | 525 | 618 | 3.0 | A | A | A |
| 26 | 69.0 | 98.0 | 589 | 688 | 2.9 | A | A | A |
| 27 | 99.0 | 118.0 | 588 | 641 | 3.6 | A | A | A |
| 28 | 87.0 | 96.0 | 566 | 631 | 3.2 | A | A | A |
| 29 | 91.0 | 112.0 | 599 | 685 | 2.6 | A | A | A |
| 30 | 65.0 | 66.0 | 650 | 759 | 3.5 | A | A | A |
| 31 | 46.0 | 49.0 | 554 | 650 | 2.2 | A | A | A |
| 32 | 55.0 | 61.0 | 668 | 745 | 1.2 | A | A | A |
| 33 | 98.0 | 88.0 | 525 | 664 | 2.8 | A | A | A |

TABLE 5-continued

| No. | CVN-80 (J) | CVN-50 (J) | 0.2% PS (MPa) | TS (MPa) | [H]d (ml/100 g) | Workability VUF | Hot Cracking (FISCO cracking) | X-Ray (Blow hole) |
|---|---|---|---|---|---|---|---|---|
| 34 | 92.0 | 102.0 | 527 | 618 | 3.0 | A | A | A |
| 35 | 86.0 | 89.0 | 608 | 725 | 3.3 | A | A | A |
| 36 | 98.0 | 111.0 | 511 | 609 | 2.5 | A | A | A |
| 37 | 99.0 | 108.0 | 519 | 608 | 2.5 | A | A | A |
| 38 | 85.0 | 102.0 | 520 | 619 | 4.8 | A | A | A |
| 39 | 88.0 | 119.0 | 543 | 629 | 3.6 | B | A | A |
| 40 | 86.0 | 98.0 | 591 | 704 | 3.3 | A | A | A |
| 41 | 75.0 | 88.0 | 590 | 690 | 2.9 | A | A | A |
| 42 | 89.0 | 98.0 | 615 | 708 | 2.9 | A | A | A |

TABLE 6

| No. | CVN-80 (J) | CVN-50 (J) | 0.2% PS (MPa) | TS (MPa) | [H]d (ml/100 g) | Workability VUF | Hot Cracking (FISCO cracking) | X-Ray (Blow hole) |
|---|---|---|---|---|---|---|---|---|
| 43 | 80.0 | 91.0 | 660 | 725 | 3.5 | A | A | A |
| 44 | 88.0 | 97.0 | 630 | 715 | 2.4 | A | A | A |
| 45 | 98.0 | 115.0 | 554 | 678 | 2.6 | A | A | A |
| 46 | 75.0 | 94.0 | 548 | 699 | 3.3 | A | A | A |
| 47 | 77.0 | 98.0 | 512 | 604 | 2.8 | A | A | A |
| 48 | 74.0 | 85.0 | 515 | 615 | 3.0 | A | A | A |
| 49 | 58.0 | 66.0 | 554 | 646 | 2.7 | A | A | A |
| 50 | 66.0 | 79.0 | 519 | 646 | 5.2 | A | A | A |
| 51 | 75.0 | 77.0 | 567 | 698 | 3.4 | C | A | A |
| 52 | 29.0 | 33.0 | 658 | 758 | 2.2 | A | A | A |
| 53 | 91.0 | 122.0 | 489 | 584 | 3.2 | A | A | A |
| 54 | 54.0 | 77.0 | 546 | 646 | 3.3 | A | C | A |
| 55 | 58.0 | 97.0 | 568 | 658 | 3.7 | A | C | A |
| 56 | 43.0 | 50.0 | 609 | 801 | 3.5 | A | A | A |
| 57 | 40.0 | 41.0 | 495 | 575 | 3.2 | A | A | C |
| 58 | 59.0 | 86.0 | 539 | 646 | 3.8 | A | C | A |
| 59 | 41.0 | 43.0 | 647 | 758 | 3.3 | A | A | A |
| 60 | 33.0 | 40.0 | 664 | 750 | 2.6 | A | A | A |
| 61 | 85.0 | 110.0 | 548 | 678 | 3.4 | C | A | A |
| 62 | 85.0 | 95.0 | 512 | 612 | 6.5 | B | A | A |
| 63 | 55.0 | 60.0 | 629 | 755 | 3.0 | A | A | A |
| 64 | 69.0 | 79.0 | 539 | 648 | 3.2 | A | A | B |
| 65 | 50.0 | 58.0 | 701 | 759 | 3.0 | A | A | A |
| 66 | 53.0 | 58.0 | 699 | 749 | 2.9 | A | B | A |
| 67 | 50.0 | 55.0 | 566 | 631 | 3.2 | A | A | A |
| 68 | 65.0 | 66.0 | 650 | 759 | 3.5 | A | A | A |
| 69 | 46.0 | 49.0 | 554 | 650 | 2.2 | A | A | A |
| 70 | 55.0 | 61.0 | 668 | 745 | 1.2 | A | A | A |
| 71 | 92.0 | 102.0 | 527 | 618 | 3.0 | A | B | A |
| 72 | 45.0 | 53.0 | 608 | 725 | 3.3 | A | A | A |
| 73 | 98.0 | 111.0 | 511 | 609 | 4.9 | B | A | A |
| 74 | 99.0 | 108.0 | 519 | 608 | 5.0 | A | A | A |
| 75 | 85.0 | 102.0 | 520 | 619 | 4.8 | A | A | A |
| 76 | 88.0 | 119.0 | 543 | 629 | 3.6 | B | A | A |
| 77 | 43.0 | 50.0 | 591 | 704 | 3.3 | A | A | A |
| 78 | 43.0 | 56.0 | 615 | 708 | 2.9 | A | A | A |
| 79 | 88.0 | 97.0 | 630 | 715 | 2.4 | B | A | A |
| 80 | 75.0 | 94.0 | 548 | 699 | 3.3 | B | A | A |
| 81 | 77.0 | 98.0 | 512 | 604 | 2.8 | B | A | A |
| 82 | 74.0 | 85.0 | 515 | 615 | 3.0 | A | A | A |

As shown in Tables 5 and 6, in No. 1 to No. 49 and No. 63 to No. 82 satisfying the ranges of the present invention, the judgments were rated as Passed.

On the other hand, in No. 50 to No. 62 not satisfying the ranges of the present invention, the judgment results were as follows.

In No. 50 where the particle size ratio of $TiO_2$ exceeded the upper limit, the diffusible hydrogen content was large.

In No. 51 where the particle size ratio of $TiO_2$ was less than the lower limit, the arc was unstable to form a convex beat, and the welding workability was poor.

In No. 52 where the C content exceeded the upper limit, the toughness was poor.

In No. 53 where the C content was less than the lower limit, the yield strength was reduced.

In No. 54 where the P content exceeded the upper limit, hot cracking occurred.

In No. 55 where the S content exceeded the upper limit, hot cracking occurred.

In No. 56 where the Mn content exceeded the upper limit, the tensile strength was excessively increased.

In No. 57 where the Mn content was less than the lower limit, the toughness was poor, the strength was reduced, and blow holes were generated.

In No. 58 where the Ni content exceeded the upper limit, the hot cracking occurred.

In No. 59 where the Ni content was less than the lower limit, the toughness was poor.

In No. 60 where the $TiO_2$ content exceeded the upper limit, the toughness was poor.

In No. 61 where the $TiO_2$ content was less than the lower limit, a convex bead was formed, and the welding workability was poor.

In No. 62 where the particle size ratio of $TiO_2$ exceeded the upper limit, the diffusible hydrogen content was large. In addition, since the total.F content was large, the welding workability was slightly poor.

The flux-cored wire of No. 62 assumes the conventional flux-cored wire described in Patent Document 1. As described in the Examples, the conventional flux-cored wire does not satisfy a certain level in the evaluations above. Thus, the Examples objectively demonstrate superiority of the flux-cored wire according to the present invention compared with the conventional flux-cored wire.

While the invention has been described in detail with reference to embodiments and Examples thereof, the gist of the present invention is not limited to the contents described above, and the scope of right thereof should be construed broadly based on the scope of claims. It goes without saying that changes, modifications, etc. to the contents of the present invention can be widely made based on the matters described above.

This application is based on Japanese Patent Application No. 2015-169351 filed on Aug. 28, 2015, the contents of which are incorporated herein by way of reference.

INDUSTRIAL APPLICABILITY

The flux-cored wire for gas-shielded arc welding of the present invention is useful particularly for offshore structures or line pipes.

DESCRIPTION OF REFERENCE NUMERALS AND SIGNS

1 Steel outer sheath
2 Flux
10 Flux-cored wire

The invention claimed is:

1. A flux-cored wire, which has a steel outer sheath filled with a flux, the flux-cored wire comprising, relative to a total mass of the wire:
C: 0.01 mass % to 0.20 mass %;
Mn: 0.5 mass % to 5.0 mass %;
$TiO_2$: 2.0 mass % to 10.0 mass %;
Ni: 0.10 mass % to 5.00 mass %;
P: 0.050 mass % or less; and
S: 0.050 mass % or less,
wherein
with respect to the $TiO_2$, a value of a ratio $\alpha1/\alpha2$ is within a range of 0.90 to 1.50, wherein $\alpha1$ is a mass percentage of a particle having a particle size of 106 µm or less relative to the total mass of the wire, and $\alpha2$ is a mass percentage of a particle having a particle size of more than 106 µm relative to the total mass of the wire.

2. The flux-cored wire according to claim 1, further comprising, relative to the total mass of the wire, at least one selected from the group consisting of Si and a Si oxide: 0.05 mass % to 1.00 mass % in total in terms of Si.

3. The flux-cored wire according to claim 1, further comprising, relative to the total mass of the wire, at least one selected from the group consisting of Cr: 0.50 mass % or less, Cu: 0.50 mass % or less, and Mo: 0.50 mass % or less.

4. The flux-cored wire according to claim 1, further comprising, relative to the total mass of the wire, metal Mg, an Mg alloy, or both: 0.10 mass % to 1.20 mass % in total in terms of Mg.

5. The flux-cored wire according to claim 1, further comprising, relative to the total mass of the wire, metal Ti, a Ti alloy, or both: 0.80 mass % or less in total in terms of Ti.

6. The flux-cored wire according to claim 1, further comprising, relative to the total mass of the wire, B, a B compound, or both: 0.0010 mass % to 0.0200 mass % in total in terms of B.

7. The flux-cored wire according to claim 1, further comprising, relative to the total mass of the wire, an F compound: 0.01 mass % to 0.50 mass % in total in terms of F, and a sum of a total in terms of Na of an Na compound and a total in terms of K of a K compound: 0.01 mass % to 1.00 mass %.

8. The flux-cored wire according to claim 1, further comprising, relative to the total mass of the wire, at least one selected from the group consisting of Nb: 0.10 mass % or less and V: 0.10 mass % or less.

9. The flux-cored wire according to claim 1, further comprising, relative to the total mass of the wire, $ZrO_2$: 0.50 mass % or less and $Al_2O_3$: 0.05 mass % to 1.00 mass %.

10. The flux-cored wire according to claim 1, further comprising, relative to the total mass of the wire, Fe: 75.00 mass % or more.

11. The flux-cored wire according to claim 1, further comprising, relative to the total mass of the wire, Cr in a content of 0.35 mass % or less.

12. The flux-cored wire according to claim 1, further comprising, relative to the total mass of the wire, Cu in a content of 0.37 mass % or less.

* * * * *